(12) United States Patent
Sha et al.

(10) Patent No.: US 7,505,094 B2
(45) Date of Patent: Mar. 17, 2009

(54) BLACK-WHITE CHOLESTERIC LIQUID CRYSTAL DISPLAY AND METHOD FOR MANUFACTURING THE SAME

(75) Inventors: Yi-An Sha, Taipei (TW); Chi-Chang Liao, Tainan (TW); Hsing-Lung Wang, Pingzhen (TW)

(73) Assignee: Industrial Technology Research Institute, Hsinchu (TW)

( * ) Notice: Subject to any disclaimer, the term of this patent is extended or adjusted under 35 U.S.C. 154(b) by 647 days.

(21) Appl. No.: 11/156,725

(22) Filed: Jun. 21, 2005

(65) Prior Publication Data

US 2006/0049380 A1 Mar. 9, 2006

(30) Foreign Application Priority Data

Sep. 7, 2004 (TW) .............................. 93126934 A

(51) Int. Cl.
*G02F 1/1333* (2006.01)
*C09K 19/38* (2006.01)
*C09K 19/02* (2006.01)

(52) U.S. Cl. ..................... 349/88; 349/93; 349/183; 349/185; 252/299.7

(58) Field of Classification Search ............... 428/1.1; 252/299.01, 299.7; 349/90, 88, 93, 183, 349/185
See application file for complete search history.

(56) References Cited

U.S. PATENT DOCUMENTS

| 5,847,798 | A | * | 12/1998 | Yang et al. | ................ 349/169 |
| 6,061,107 | A | * | 5/2000 | Yang et al. | ................ 349/86 |
| 6,863,843 | B2 | * | 3/2005 | Hughes et al. | ................ 252/586 |

* cited by examiner

*Primary Examiner*—Shean C Wu
(74) *Attorney, Agent, or Firm*—WPAT. P.C.; Justin King

(57) ABSTRACT

A black-white liquid crystal display using a cholesteric liquid crystal material and a method for manufacturing such a liquid crystal display using polymerization/phase-separation, resulting in diffused polymeric molecules and polymeric cell walls, so as to minimize the manufacturing time, strengthen the polymeric wall and enhance the contrast ratio as well as the brightness.

22 Claims, 3 Drawing Sheets

BLACK-WHITE CHOLESTERIC LIQUID CRYSTAL DISPLAY AND METHOD FOR MANUFACTURING THE SAME

BACKGROUND OF THE INVENTION

1. Field of the Invention

The present invention generally relates to a black-white cholesteric liquid crystal display and a method for manufacturing the same and, more particularly, to a black-white liquid crystal display using a cholesteric liquid crystal material and a method for manufacturing such a liquid crystal display using polymerization/phase-separation, resulting in diffused polymeric molecules and polymeric cell walls, so as to minimize the manufacturing time, strengthen the polymeric cell walls and enhance the contrast ratio as well as the brightness.

2. Description of the Prior Art

In recent years, the development in flat panel displays such as "electronic papers" and "electronic books" has been tremendously growing. For use in the flat panel displays, there are several types of display cells including the liquid crystal display, the electrophoresis display, the electrochromism display, the electrolysis display, etc. Especially for use in electronic papers, the cholesteric liquid crystal display has advantages over others in brightness, contrast ratio and is easier to drive.

In the U.S. Pat. No. 5,847,798, entitled "Polymer Stabilized Black-White Cholesteric Reflective Display", Yang and Ma (Kent State University) disclose a cholesteric liquid crystal display. As shown in FIG. 1A and FIG. 1B, which are schematic diagrams showing respectively the planar state and the focal conic state of a conventional cholesteric liquid crystal display. The cholesteric liquid crystal display exhibits two stable states at zero electro field applied, namely, the planar state and the focal conic state. In FIG. 1A and FIG. 1B, the cholesteric liquid crystal display 10 comprises a substrate 11, on which is covered a transparent electrode 12 such as an indium-tin oxide (ITO) film or the like. The cholesteric liquid crystal display 10 is filled with a cholesteric liquid crystal material 13, which is mixed with dispersed phase-separated polymer domains 14. On one side of the substrate 11 is stacked an absorption layer 15, usually implemented as black. Furthermore, an AC voltage source 16 is connected to the electrodes 12 in order to switch the liquid crystal display 10 between different optical states.

In FIG. 1A, a predetermined voltage value 16 is applied to the cholesteric liquid crystal display 10 and then removed to place the liquid crystal material 13 in the planar state. When a cholesteric liquid crystal material 13 is in the planar state, the helical axes are more or less perpendicular to the surface of the crystal display 10. When an enviroment light 17, as seen by an eye, is incident on the cholesteric liquid crystal display 10, as represented by an arrow with the numeral designation 17, light is reflected as represented by an arrow with the numeral designation 18. The central or primary wave length of the reflection band depends on the pitch, average refractive index and birefringence of the cholesteric liquid crystal material.

In FIG. 1B, a predetermined voltage value 16 is applied to the cholesteric liquid crystal display 10 and then removed to place the liquid crystal material 13 in the focal conic state. When a cholesteric liquid crystal material 13 is in the focal conic state, the helical axes are more or less randomly arranged. When an enviroment light 17, as seen by an eye, is incident on the cholesteric liquid crystal display 10, as represented by an arrow with the numeral designation 17, little of reflected light as represented by an arrow with the numeral designation 18 goes through the upper substrate 11. Moreover, an absorption layer 15 with a black color can be used such that the polymer domains associated with the focal conic state appear black.

However, the above-mentioned invention has a problem in that it takes about 1.5 hours to form the dispersed polymer domains because the dispersed polymer domains are formed under relatively weaker UV light without masks.

Moreover, for the application of flexible displays, polymeric walls are popularly used to strengthen the cell gap. The polymeric walls are formed using polymerization/phase-separation as disclosed in the U.S. Pat. No. 5,473,450 filed by Sharp Kabushiki Kaisha (Japan). In order to further strengthen the cell gap, micro-capsules are formed by micro-encapsulating polymer molecules and liquid crystal molecules in the display cell, as described in the U.S. Pat. No. 6,120,701 and No. 6,203,723 filed by Hsu.

Therefore, there is need in providing a black-white liquid crystal display using a cholesteric liquid crystal material and a method for manufacturing such a liquid crystal display using polymerization/phase-separation, resulting in diffused polymeric molecules and polymeric cell walls, so as to minimize the manufacturing time, strengthen the polymeric cell walls and enhance the contrast ratio as well as the brightness.

SUMMARY OF THE INVENTION

It is the primary object of the present invention to provide a black-white liquid crystal display and a method for manufacturing such a liquid crystal display, so as to minimize the manufacturing time of the liquid crystal display.

It is another object of the present invention to provide a black-white liquid crystal display and a method for manufacturing such a liquid crystal display, so as to strengthen the polymeric cell walls of the liquid crystal display.

It is still another object of the present invention to provide a black-white liquid crystal display and a method for manufacturing such a liquid crystal display, so as to enhance the contrast ratio as well as the brightness of the liquid crystal display.

In order to achieve the foregoing objects, the present invention provides a black-white cholesteric liquid crystal display, comprising: a pair of substrates, formed symmetrically on both sides of said black-white cholesteric liquid crystal display; a pair of transparent electrodes, formed symmetrically on inner surfaces of said substrates; a pair of alignment layers, formed symmetrically on inner surfaces of said transparent electrodes; and a display layer, formed between said alignment layers, said display layer comprising a cholesteric liquid crystal material, diffused polymeric molecules and polymeric cell walls.

The present invention further provides a method for manufacturing a black-white cholesteric liquid crystal display, comprising steps of: providing a pair of substrates, formed symmetrically on both sides of said black-white cholesteric liquid crystal display; providing a pair of transparent electrodes, formed symmetrically on inner surfaces of said substrates; providing a pair of alignment layers, formed symmetrically on inner surfaces of said transparent electrodes; providing a display layer, formed between said alignment layers, said display layer comprising a cholesteric liquid crystal material and monomers; and performing an UV-enhanced polymerization process, forming diffused polymeric molecules and polymeric cell walls in said display layer.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms.

BRIEF DESCRIPTION OF THE DRAWINGS

The objects, spirits and advantages of the preferred embodiment of the present invention will be readily understood by the accompanying drawings and detailed descriptions.

DETAILED DESCRIPTION OF THE INVENTION

The present invention providing a black-white cholesteric liquid crystal display and a method for manufacturing the same can be exemplified by the preferred embodiment as described hereinafter.

Figure 1A:
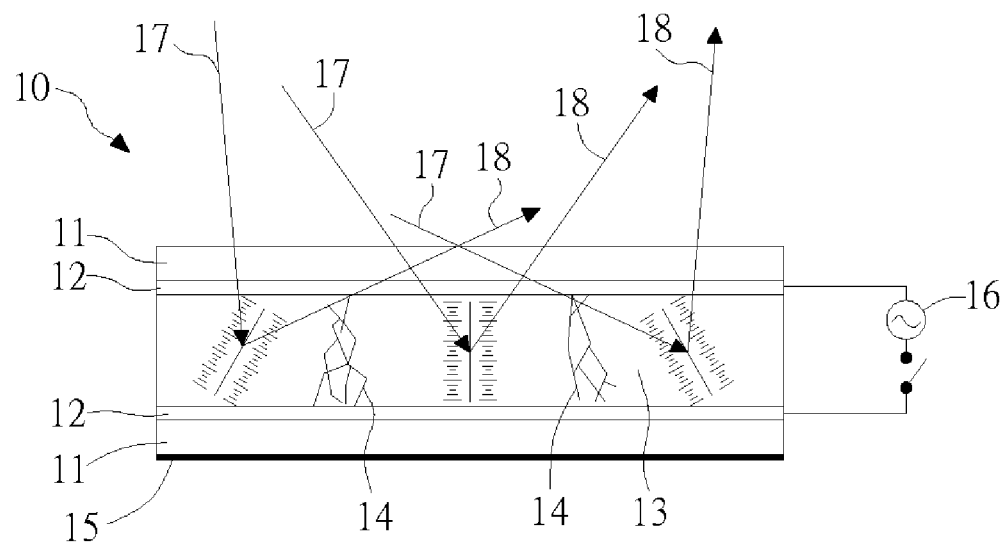
FIG. 1A is a schematic cross-sectional diagram showing the planar state of a conventional black-white cholesteric liquid crystal display.
Figure 1B:
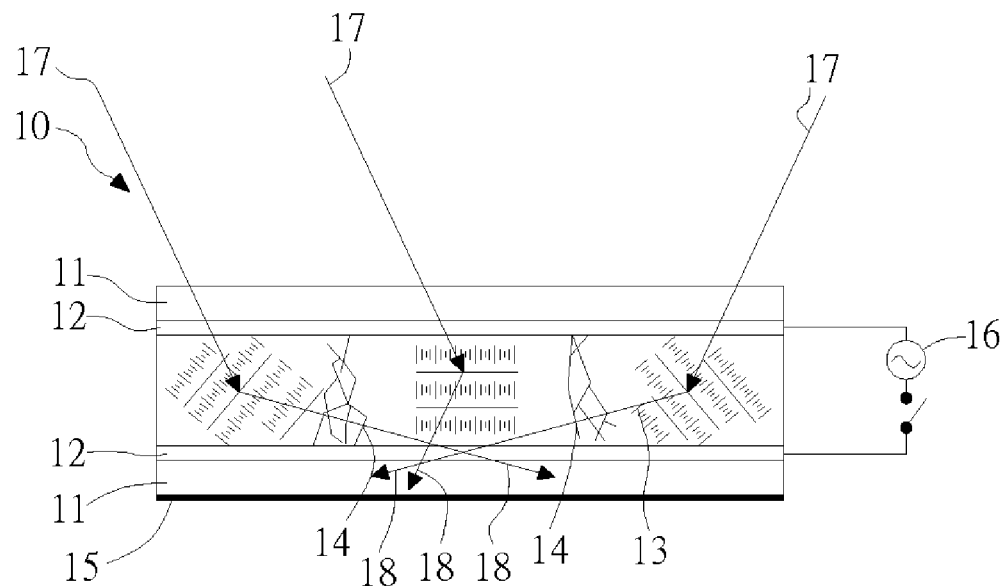
FIG. 1B is a schematic cross-sectional diagram showing the focal conic state of a conventional cholesteric liquid crystal display.
Figure 2:
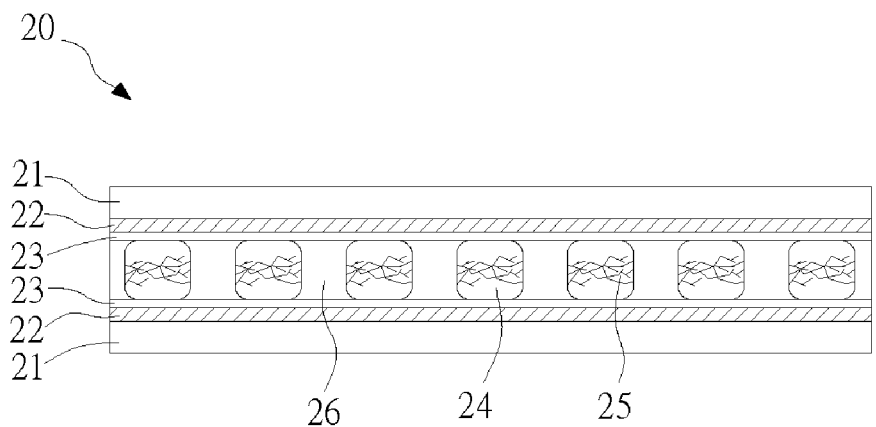
FIG. 2 is a schematic cross-sectional diagram showing a black-white cholesteric liquid crystal display according to the present invention.

Please refer to FIG. 2, which is a schematic cross-sectional diagram showing a black-white cholesteric liquid crystal display according to the present invention. In FIG. 2, the black-white cholesteric liquid crystal display 20 comprises a pair of substrates 21 which are symmetrically coated with a pair of transparent electrodes 22 on inner surfaces of the substrates 21. Furthermore, a pair of alignment layers 23 are formed symmetrically on inner surfaces of the transparent electrodes 22. A cholesteric liquid crystal material 24 is mixed with diffused polymeric molecules 25 and is formed between the alignment layers 23. Thereby, the diffused polymeric molecules 25 disorder the arrangement of the cholesteric liquid crystal material 24 and turn the planar state into a multi-domain planar state, hence increasing the brightness of white light. Furthermore, the liquid crystal cell is strengthened by polymeric cell walls 26.

In the present invention, the substrates 21 are selected from a group consisting of glass substrates, plastic substrates, metal substrates and flexible substrates. The transparent electrodes 22 are formed of one material selected from a group consisting of one inorganic conductive material and one organic conductive material. The alignment layers are formed of one material selected from a group consisting of polyvinyl alcohol, polyimide, polyamide, nylon, silicon-dioxide, lecithin and micro-groove structures.

Figure 3:
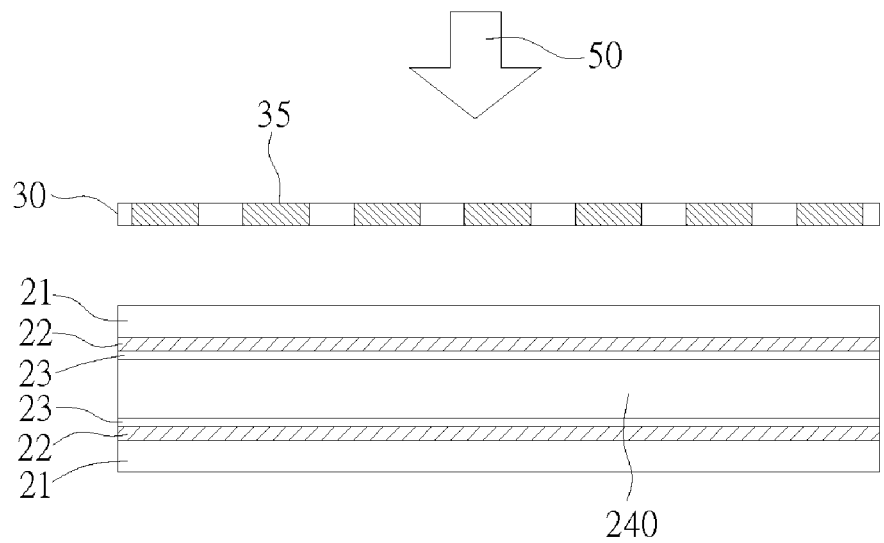
FIG. 3 is a schematic cross-sectional diagram showing a method for manufacturing a black-white cholesteric liquid crystal display according to the present invention.

FIG. 3 is a schematic cross-sectional diagram showing a method for manufacturing a black-white cholesteric liquid crystal display according to the present invention. The method comprises steps of: providing a pair of substrates 21, formed symmetrically on both sides of the black-white cholesteric liquid crystal display 20; providing a pair of transparent electrodes 22, formed symmetrically on inner surfaces of the substrates 21; providing a pair of alignment layers 23, formed symmetrically on inner surfaces of the transparent electrodes 22; providing a display layer, formed between the alignment layers 23, the display layer comprising a mixture 240 including a cholesteric liquid crystal material and monomers; and performing an UV-enhanced polymerization process, forming diffused polymeric molecules 25 and polymeric cell walls 26 in the display layer.

More particularly, the UV-enhanced polymerization process is performed by exposing the display layer to UV light 50. A mask 30 with a pattern 35 is provided between the UV light source 50 and the black-white cholesteric liquid crystal display 20. In the present invention, the mixture 240 under the transparent part of the mask 30 is exposed to the UV light such that polymeric cell walls 26 are formed by the monomers under the transparent part of the mask 30 while diffused polymeric molecules 25 are formed by free radicals and monomers under the dark part of the mask 30. Meanwhile, the cholesteric liquid crystal material 24 does not diffuse into the region under the dark part of the mask 30.

A second exposure step by exposing the display layer directly to UV light is performed after the previous step as to polymerize the remaining monomers without using any mask. Thus the cell gap can be further strengthened.

In one preferred embodiment of the present invention, it only takes 10 minutes to complete the diffused polymeric molecules 25 and the polymeric cell walls 26 in the display layer.

Figure 4:
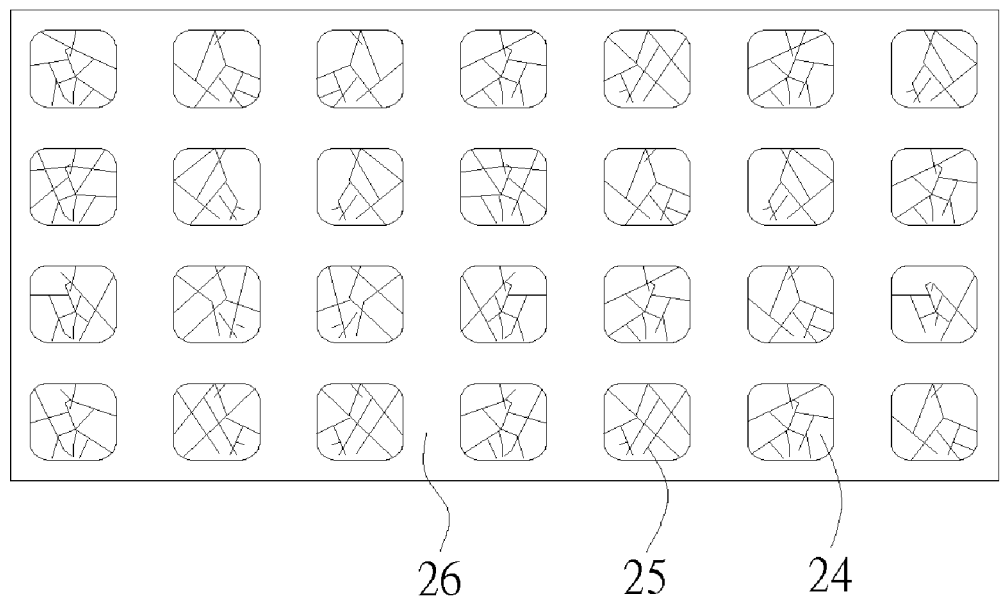
FIG. 4 is a top view showing a black-white cholesteric liquid crystal display according to the present invention.

Please further refer to FIG. 4, which is a top view showing a black-white cholesteric liquid crystal display according to the present invention. It is noted that the pattern of the mask is only exemplificative and should not be regarded as limitations to the scope of the present invention. Various modifications are apparent to persons skilled in the art and are not described hereinafter.

Color deviation often occurs due to the liquid crystal display manufacturing process. In the present invention, dyeing is used to overcome the color deviation phenomenon. For example, when the display exhibits red shift, the cholesteric liquid crystal material is dyed with blue dyes; when the display exhibits blue shift, the cholesteric liquid crystal material is dyed with red dyes; and when the display exhibits green shift, the cholesteric liquid crystal material is dyed with red dyes.

According to the above discussion, the present invention discloses a black-white liquid crystal display and a method for manufacturing such a liquid crystal display using polymerization/phase-separation, resulting in diffused polymeric molecules and polymeric cell walls, so as to minimize the manufacturing time, strengthen the polymeric cell walls and enhance the contrast ratio as well as the brightness. Therefore, the present invention has been examined to be new, non-obvious and useful.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A black-white cholesteric liquid crystal display, comprising:
   a pair of substrates, formed symmetrically on both sides of said black-white cholesteric liquid crystal display;
   a pair of transparent electrodes, formed symmetrically on inner surfaces of said substrates;
   a pair of alignment layers, formed symmetrically on inner surfaces of said transparent electrodes; and a display layer, formed between said alignment layers, said display layer comprising a cholesteric liquid crystal material mixed with diffused polymeric molecules, and polymeric cell walls.

2. The black-white cholesteric liquid crystal display as recited in claim 1, wherein said substrates are selected from a group consisting of glass substrates, plastic substrates, metal substrates and flexible substrates.

3. The black-white cholesteric liquid crystal display as recited in claim 1, wherein said transparent electrodes are formed of one material selected from a group consisting of one inorganic conductive material and one organic conductive material.

4. The black-white cholesteric liquid crystal display as recited in claim 1, wherein said alignment layers are formed of one material selected from a group consisting of polyvinyl alcohol, polyimide, polyamide, nylon, silicon-dioxide, lecithin and micro-groove structures.

5. The black-white cholesteric liquid crystal display as recited in claim 1, wherein said cholesteric liquid crystal material includes a mixture of nematic liquid crystals and chiral liquid crystals.

6. The black-white cholesteric liquid crystal display as recited in claim 1, wherein said cholesteric liquid crystal material is mixed with at least a dye capable of absorbing light having a wavelength ranging from 380 nm to 900 nm.

7. The black-white cholesteric liquid crystal display as recited in claim 1, wherein said polymeric cell walls are formed by an UV-enhanced polymerization process.

8. The black-white cholesteric liquid crystal display as recited in claim 1, wherein said diffused polymeric molecules are formed by diffusion of initiators during polymerization.

9. The black-white cholesteric liquid crystal display as recited in claim 1, wherein said diffused polymeric molecules are formed by diffusion of free-radical during polymerization.

10. The black-white cholesteric liquid crystal display as recited in claim 7, wherein said UV-enhanced polymerization process comprises: performing a first exposure step by exposing said display layer to UV light though a mask.

11. The black-white cholesteric liquid crystal display as recited in claim 10, wherein said UV-enhanced polymerization process further comprises: performing a second exposure step by exposing said display layer directly to UV light to polymerize the remaining monomers without using any mask.

12. A method for manufacturing a black-white cholesteric liquid crystal display, comprising steps of: providing a pair of substrates, formed symmetrically on both sides of said black-white cholesteric liquid crystal display; providing a pair of transparent electrodes, formed symmetrically on inner surfaces of said substrates; providing a pair of alignment layers, formed symmetrically on inner surfaces of said transparent electrodes; providing a display layer, formed between said alignment layers, said display layer comprising a cholesteric liquid crystal material and monomers; and performing an UV-enhanced polymerization process, forming diffused polymeric molecules mixed with the cholesteric liquid crystal, and polymeric cell walls in said display layer.

13. The method as recited in claim 12, wherein said substrates are selected from a group consisting of glass substrates, plastic substrates, metal substrates and flexible substrates.

14. The method as recited in claim 12, wherein said transparent electrodes are formed of one material selected from a group consisting of one inorganic conductive material and one organic conductive material.

15. The method as recited in claim 12, wherein said alignment layers are formed of one material selected from a group consisting of polyvinyl alcohol, polyimide, polyamide, nylon, silicon-dioxide, lecithin and micro-groove structures.

16. The method as recited in claim 12, wherein said cholesteric liquid crystal material includes a mixture of nematic liquid crystals and chiral liquid crystals.

17. The method as recited in claim 12, wherein said cholesteric liquid crystal material is mixed with at least a dye capable of absorbing light having a wavelength ranging from 380 nm to 900 nm.

18. The method as recited in claim 12, wherein said polymeric cell walls are formed by an UV-enhanced polymerization process.

19. The method as recited in claim 12, wherein said diffused polymeric molecules are formed by diffusion of initiators during polymerization.

20. The black-white cholesteric liquid crystal display as recited in claim 12, wherein said diffused polymeric molecules are formed by diffusion of free-radical during polymerization.

21. The method as recited in claim 12, wherein said UV-enhanced polymerization process comprises: performing a first exposure step by exposing said display layer to UV light though a mask.

22. The method as recited in claim 21, wherein said UV-enhanced polymerization process further comprises: performing a second exposure step by exposing said display layer directly to UV light to polymerize the remaining monomers without using any mask.

* * * * *